(12) United States Patent
Noble

(10) Patent No.: US 8,661,697 B2
(45) Date of Patent: Mar. 4, 2014

(54) SLOPE ASSESSMENT TOOL

(76) Inventor: Jack Noble, Sedro Wooley, WA (US)

(*) Notice: Subject to any disclaimer, the term of this patent is extended or adjusted under 35 U.S.C. 154(b) by 248 days.

(21) Appl. No.: 13/174,395

(22) Filed: Jun. 30, 2011

(65) Prior Publication Data
US 2012/0180330 A1  Jul. 19, 2012

Related U.S. Application Data

(60) Provisional application No. 61/360,094, filed on Jun. 30, 2010.

(51) Int. Cl.
*G01B 21/00* (2006.01)

(52) U.S. Cl.
USPC .............................................. 33/343; 33/473

(58) Field of Classification Search
USPC ................... 33/343, 464, 465, 473, 293, 295
See application file for complete search history.

(56) References Cited

U.S. PATENT DOCUMENTS

| 1,272,069 | A | * | 7/1918 | McMillian | 33/293 |
| 1,842,724 | A | * | 1/1932 | Langsner | 403/106 |
| 4,993,160 | A | * | 2/1991 | Fraley | 33/293 |
| 6,487,781 | B2 | * | 12/2002 | Johnson | 33/293 |
| 2002/0083606 | A1 | * | 7/2002 | Monteil et al. | 33/295 |
| 2003/0079356 | A1 | * | 5/2003 | Crain et al. | 33/296 |
| 2009/0059213 | A1 | * | 3/2009 | Wesby | 33/228 |

* cited by examiner

*Primary Examiner* — G. Bradley Bennett
(74) *Attorney, Agent, or Firm* — Dwayne E. Rogge; Schacht Law Office, Inc.

(57) ABSTRACT

Applicant has devised a slope measurement tool which can be arranged in a compact storage configuration which is relatively small and lightweight. The tool can be reconfigured to several different configurations to measure the slopes of trenches, benched slopes, and other excavations. The slope measurement tool devised is adjustable to measure several different specified angles. In one form, the apparatus can be utilized to measure benching, which is described in the OSHA code.

6 Claims, 7 Drawing Sheets

US 8,661,697 B2

SLOPE ASSESSMENT TOOL

RELATED APPLICATIONS

This application claims priority benefit of U.S. Provisional Application Ser. No. 61/360,094, filed Jun. 30, 2010.

BACKGROUND OF THE DISCLOSURE a) Field of the Disclosure

This application relates to the field of surveying type tools for measuring the slope of an environmental surface.

SUMMARY OF THE DISCLOSURE

Disclosed herein is a slope assessment tool having a rigid survey rod; a baseplate movably attached to the survey rod adjustable along a long axis of the survey rod; a level indicator indicating the vertical alignment of the survey rod and/or baseplate; and a slope rod rotateably coupled to the baseplate. In one form the slope rod is positionably coupled to the baseplate so as to be coupled to the baseplate at varying locations along the slope rod. The slope assessment tool may be magnetically coupled to the baseplate.

To ensure proper alignment, the slope assessment tool may utilize an angle indicator indicating the relative angular position of the slope rod relative to the survey rod. This angle indicator may utilize a ball and socket arrangement for correct angular positioning of the slope rod relative to the survey rod.

The slope assessment tool may be arranged wherein the level indicator is coupled to the baseplate, to a clamp between the baseplate and the survey rod, or to the survey rod itself.

DESCRIPTION OF THE PREFERRED EMBODIMENTS

Applicant has devised a slope measurement tool in several embodiments which can be arranged in a compact storage configuration which is relatively small and lightweight. The tool can be reconfigured to several different configurations to measure the slopes of trenches, benched slopes, and other excavations. The slope measurement tool devised may be adjustable to measure several different specified angles. In one form, the apparatus can be utilized to measure benching, which is described in the OSHA code. Additionally, in one embodiment, the device comprises a level indicator which may also serve as an extension. This extension allows a user to measure the slope of an excavation without getting too close to the upper edge of the excavation, which is potentially hazardous. The tool may be comprised of one or more metals, synthetic materials such as fiberglass or plastics, or even potentially wood and other non-synthetic materials. Of course, durability, ease-of-use, and overall weight are considered in the choice of material.

In general, the slope assessment tool 20 disclosed herein allows a user to determine either 1) whether an excavated surface is of the correct slope or angle to horizontal or 2) whether benching has been achieved at the correct vertical and horizontal parameters. Benching is defined as a step like excavation, having a particular rise and a particular run for a given excavation and/or soil types.

Figure 1:
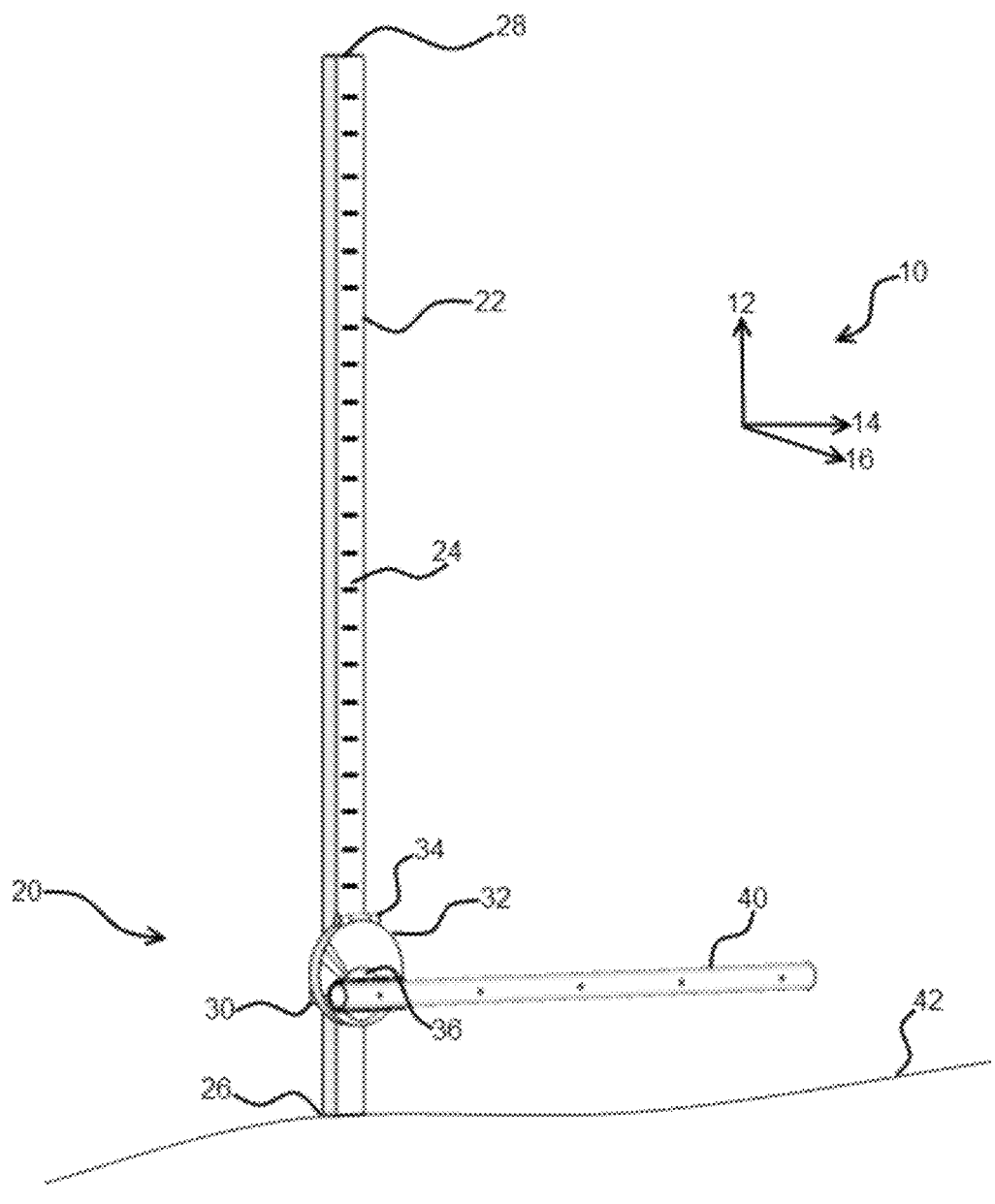
FIG. 1 is an isometric view of the slope assessment tool in one form attached to a standard survey rod.
Figure 4:
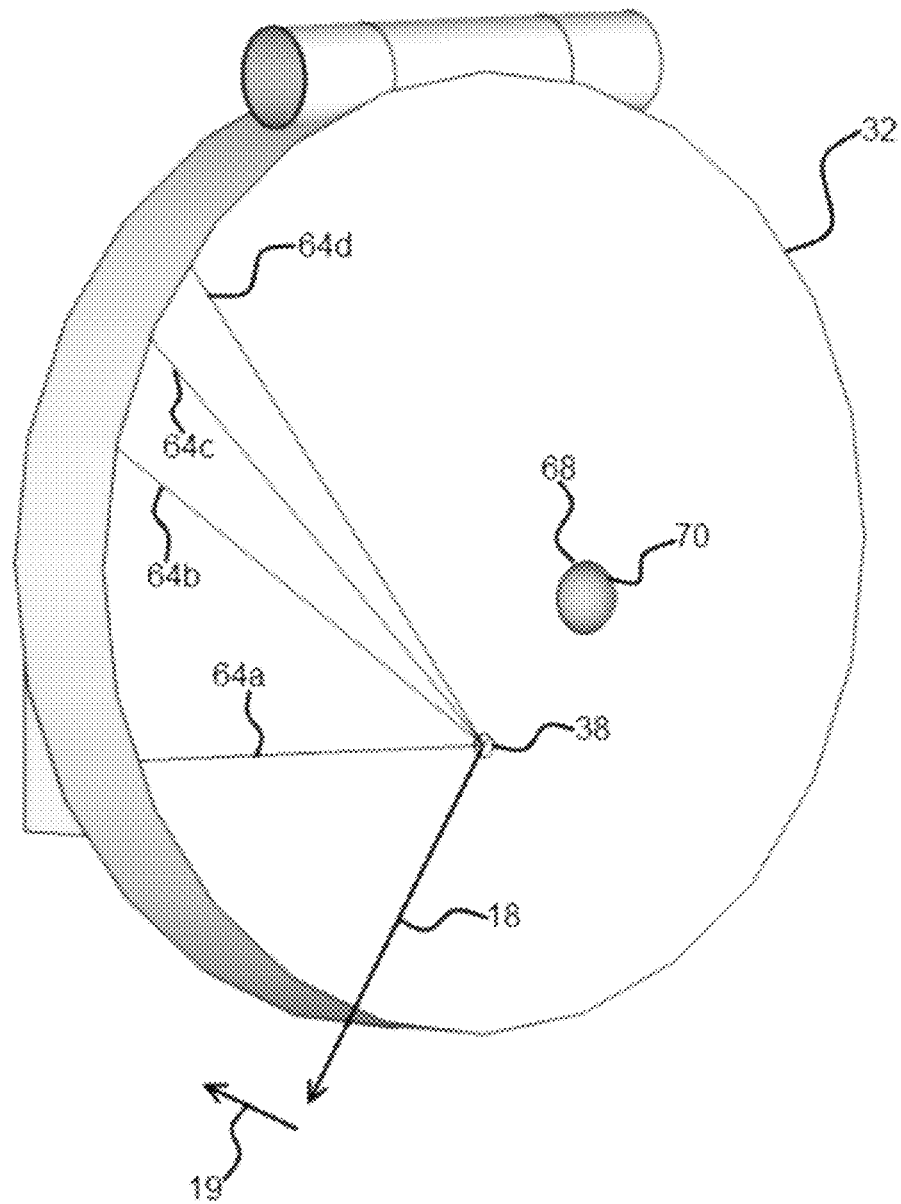
FIG. 4 is an isometric view of the slope assessment tool of FIG. 3 with the pivot portion removed to show the underlying components.

Before beginning a detailed description of the particular embodiments, an axis system 10 is shown in FIG. 1 comprising a vertical axis 12, a horizontal axis 14 and a transverse axis 16, which is orthogonal to both the vertical axis 12 and the horizontal axis 14 and is by definition horizontal, but will be differentiated as described. Looking also to FIG. 4, a radial axis 18 is shown centered upon the pivot axis of the base plate, which will be described in more detail. Additionally, a rotational axis 19 is also shown in FIG. 4, which is generally a circular rotation about the pivot axis.

The slope assessment tool 20, shown in FIG. 1, comprises a novel assembly attached to a prior art survey rod 22, which is well-known in the art and often comprise markings 24 showing the distance from the lowest end 26 to the upper and 28. As one of ordinary skill in art would know the survey rods 22 are often extendable in that an inner portion is received within an outer portion, such that a long survey rod 22 can be easily carried and stored.

The novel components of the slope assessment tool 20 may comprise a clamp 30 which attaches to the survey rod 22, and a base plate 32, which is, in one form, fixedly coupled to the clamp 30 and includes a level 34 in some embodiments. A pivot portion 36 is coupled to the base plate 32 at the pivot axis 38, shown in FIG. 4. In one form, the pivot portion 36 rotates about the pivot axis 38 relative to the base plate 32. A slope rod 40 is removably coupled to the pivot portion 36, and in one form the slope rod can be horizontally adjusted relative to the pivot portion 36, as will be described in more detail. As shown, the lowest end 26 of the survey rod 22 is in contact with the excavated surface 42, and as the slope rod 40 is substantially parallel to the excavated surface 42 directly below the slope rod 40, the grade or slope of the excavated surface 42 can easily be determined.

Figure 2:
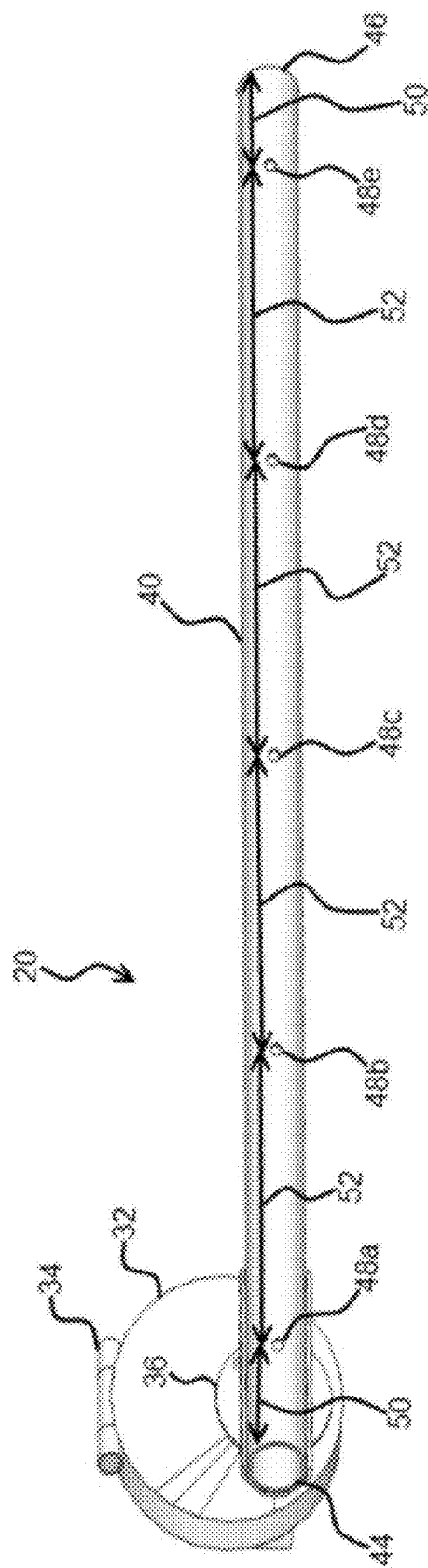
FIG. 2 is an isometric view of the slope assessment tool of FIG. 1 removed from the standard survey rod.
Figure 7:
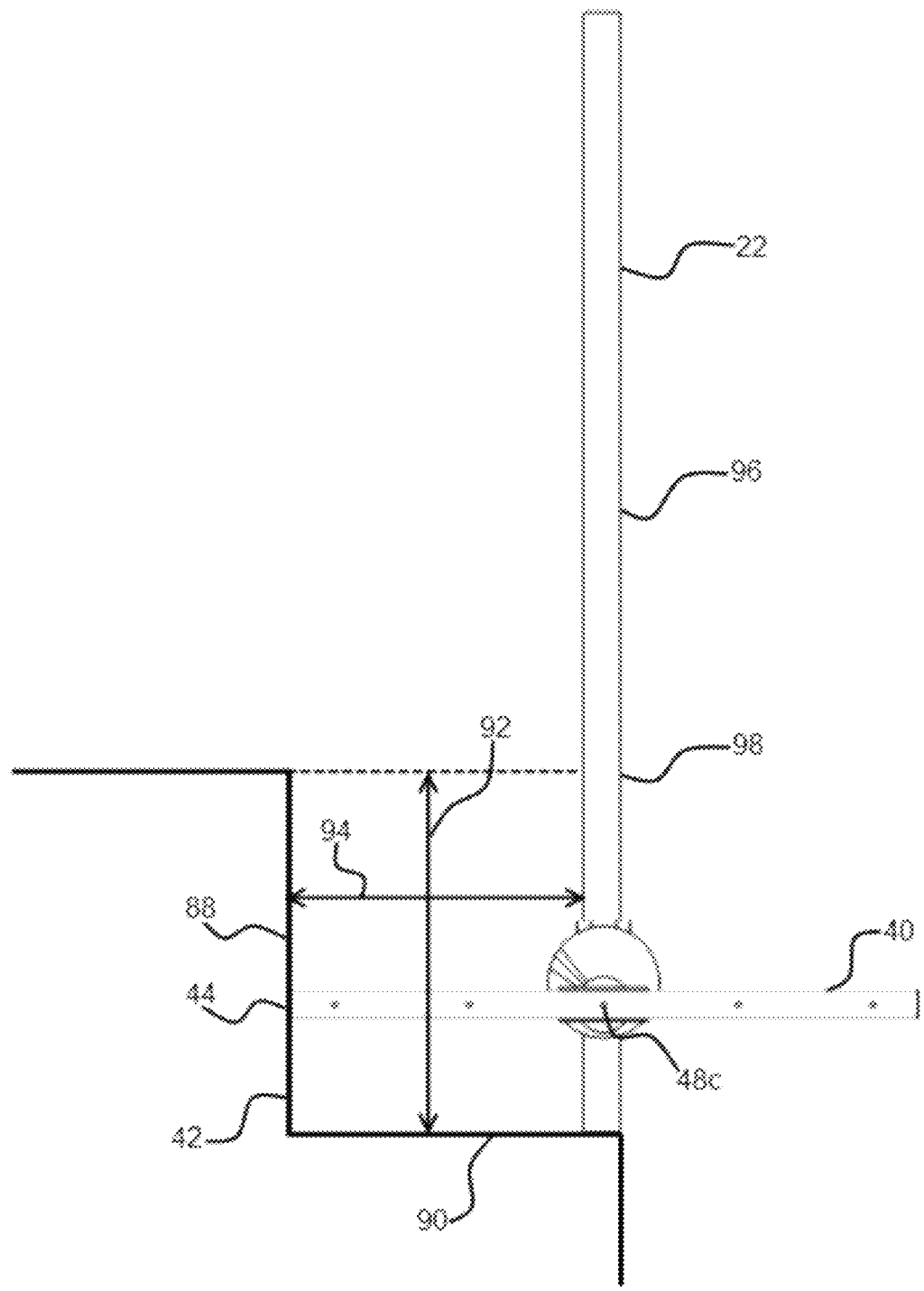
FIG. 7 is a front view of the slope assessment tool in one form, being used to measure a benched excavation.

Looking now to FIG. 2, the novel portions of the slope assessment tool 20 can more easily be seen. In particular, the slope rod 40 is shown as a cylindrical tube, although other configurations would work equally as well. The slope rod 40 generally comprises a first end 44 and a second end 46. In one form, markings are shown between the first end 44 and second end 46, which are particularly useful in measuring bench work excavations as shown in FIG. 7. In the embodiment shown in FIG. 2, the markings are provided as voids 48. A numbering system is utilized in this application wherein a numeric prefix may depict a general category, and an alpha suffix depicts particular elements within that general category. For example, the voids 48 include particular voids 48a-48e. In one particular example, the spacing 50 between the first end 44 and first void 48a is 2 inches, and the spacing between the first void 48a and the second void 48b is 6 inches.

Figure 3:
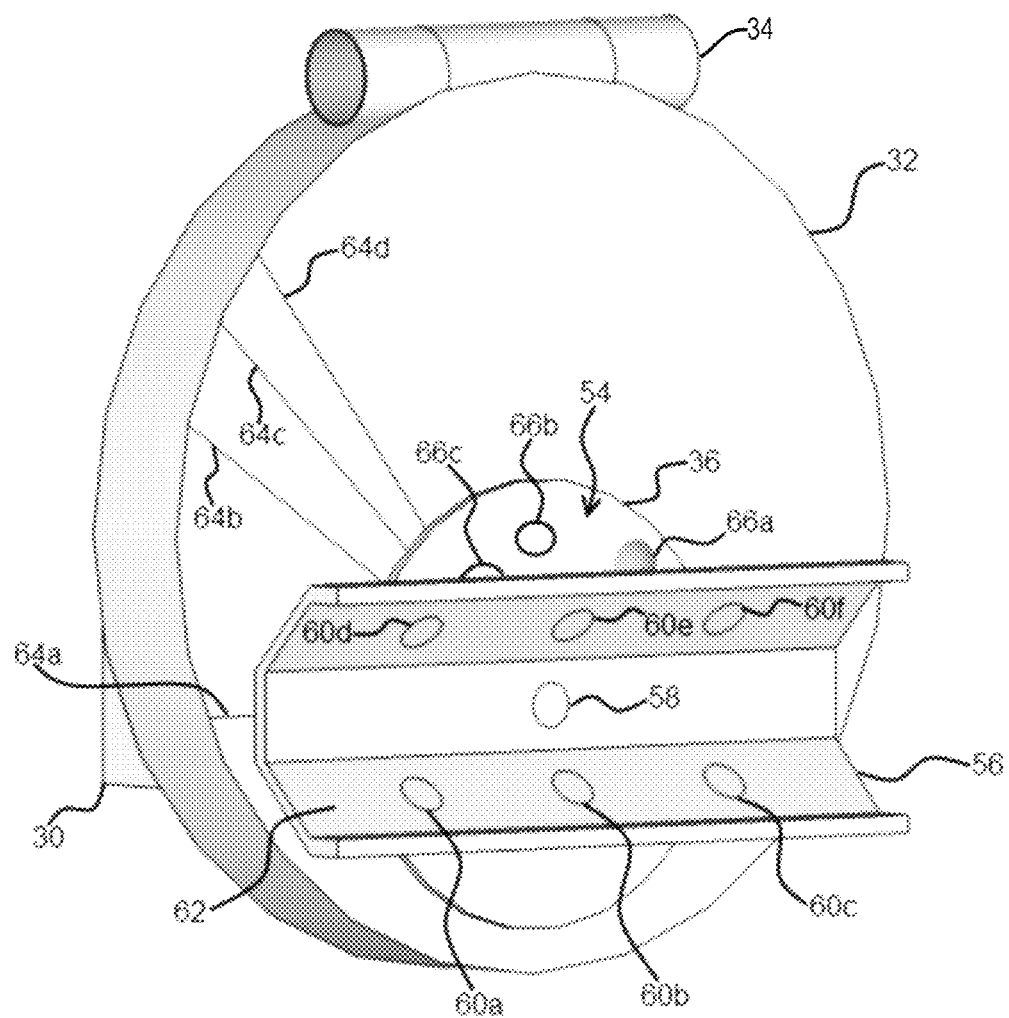
FIG. 3 is an isometric view of the slope assessment tool of FIG. 2 with the slope rod removed to show the underlying components.

FIG. 3 shows one embodiment where the base plate 32, level 34, and pivot portion 36 with the slope rod 40 removed to show the underlying components. In particular, the pivot portion 36 comprises an indexing system 54 and a slope rod holder 56. In one form, the slope rod holder 56 comprises at least one detent 58, which can be used to index the slope rod 40 horizontally within the slope rod holder 56, in that the detent 58 would be received by one of the voids 48, and thus rigidly and removably align the slope rod 40 within the slope rod holder 56 at a particular horizontal location. In one form, a plurality of magnets 60 could be utilized if the slope rod 40 were ferrous to further hold the slope rod 40 within the slope rod holder 56. The interior surface 62 of the slope rod holder 56 could clamp upon the slope rod 40 using any known method to hold the slope rod 40 there within.

The indexing system 54, in one form, is utilized to adjust the slope rod 40 angularly relative to the base plate 32. As is well known to one of ordinary skill in the art, particular slopes are often desired for particular excavations and soil types. For example, angles of 34°, 45°, and 53° are desired as defined by the standards listed above. Thus, the indexing system 54 may utilize markings 64 for angles of, for example, 90° (64a), 34° (64b), 45° (64c), and 53° (64d). The pivot portion 36 and attached slope rod holder 56 can be rotated to line up with any one of these markings 64 or, alternatively, a plurality of detents 66 can be utilized with other components to be disclosed later. For example, detents can be utilized for indexing of 90° (66a), 34° (66b), and 45° (66c). As the pivot portion 36 rotates relative to the base plate 32, a tactile feel would be incurred as the indexing system 54 is utilized, thus giving positive and accurate feedback to the user when the appropriate angle is reached. Such a device is often referred to as a ball and socket arrangement.

Looking to FIG. 4, one form of the pivot axis 38 is shown, which could be a threaded hole through which a threaded fastener could pass, thus attaching the pivot portion 36 to the base plate 32, although other mechanisms could also be utilized. Additionally, a void 68 is shown, which in one form would house a compression spring (not shown) and a ball 70 or equivalent apparatus that would be biased outward into the voids 66 of the pivot portion 36 to enable the indexing system 54 previously described.

Figure 5:
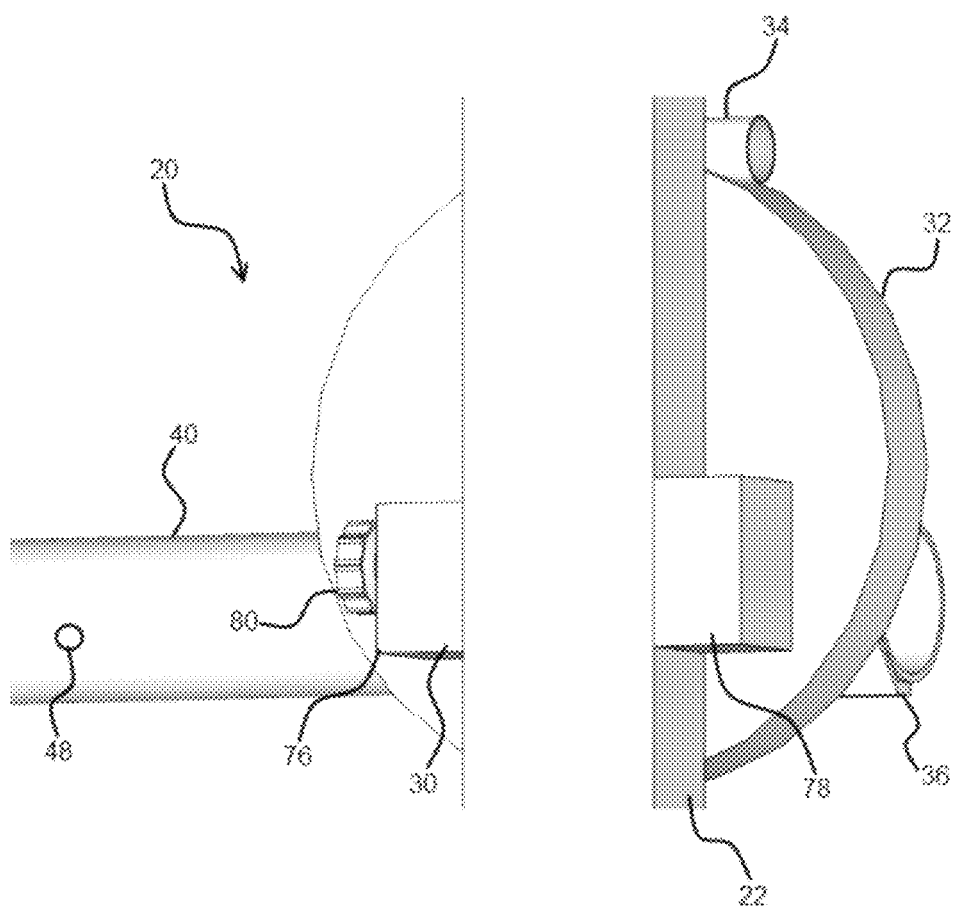
FIG. 5 is an isometric view of the slope assessment tool of FIG. 1 from a reverse angle.

FIG. 5 shows the apparatus or slope assessment tool 20 from a reverse angle from that shown in FIG. 1. While it may be desirable to have the base plate 32 fixedly and rigidly coupled to the survey rod 22, this may be disadvantageous in other applications, and thus in one embodiment, a clamp 30 is provided to fixedly and removably attach the slope assessment tool 20 to the survey rod 22. While different clamping methods could be utilized, shown herein is a clamp 30, comprising a first side portion 76, a second side portion 78, and a tension device 80, such as a bolt with a knurled nut or similar portion to allow tensioning of the clamp 30 relative to the outer surface of the survey rod 22.

Figure 6:
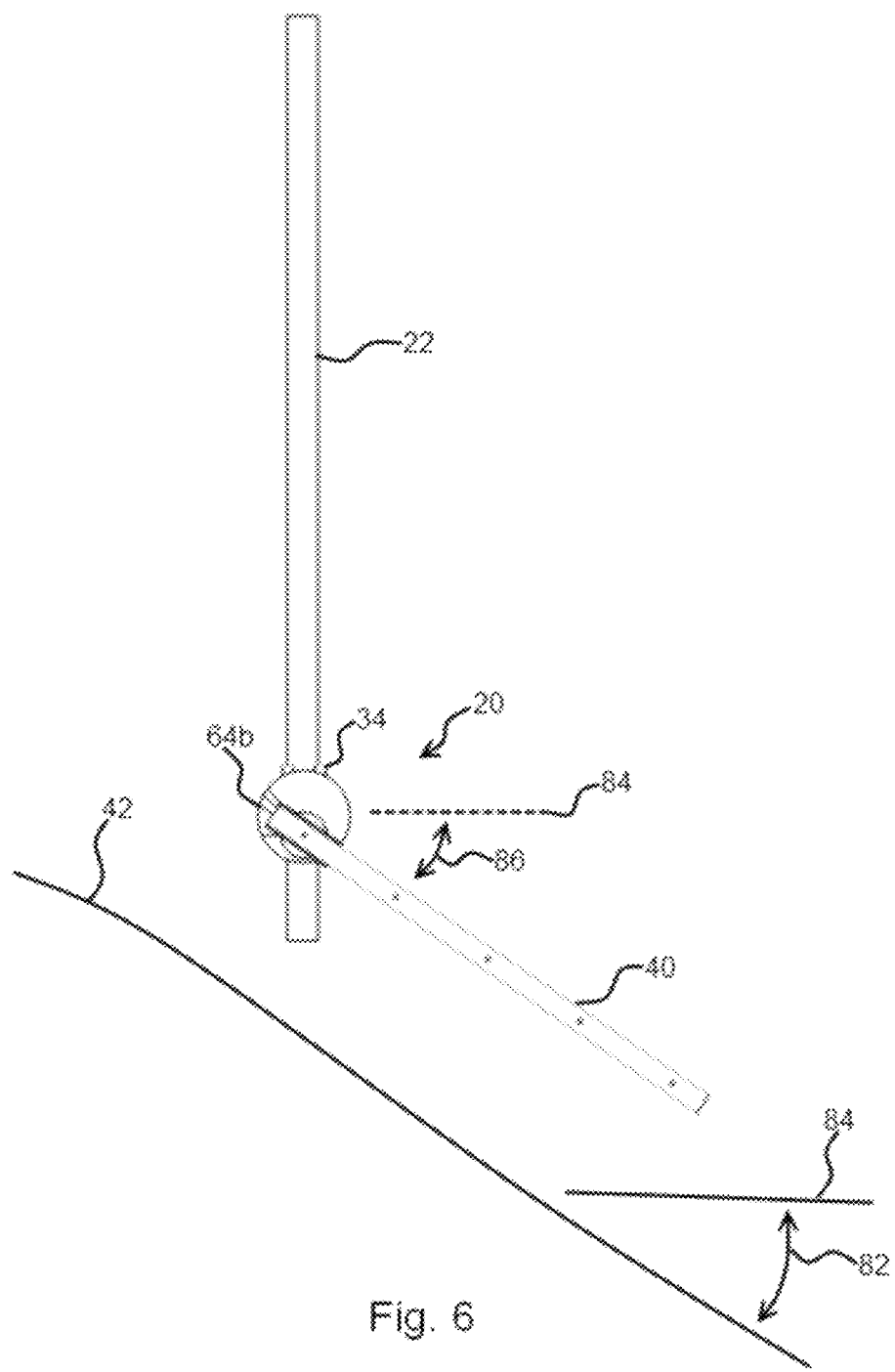
FIG. 6 is a front view of the slope assessment tool in one form, at a 34° angle to horizontal.

The principle of operation of the slope assessment tool 20 is shown in FIG. 6, wherein the excavated surface 42 comprises a slope 82, being defined as the angle between the plane of the excavated surface 42 and a horizontal plane 84. As shown, the slope rod 40 has been rotated to the 34° setting 64b, and thus the angle 86 from the slope rod 40 to the horizontal plane 84 is substantially 34° as indicated when the survey rod 22 is in a fully vertical position. The fully vertical position can be easily determined by looking to the level 34 as determined by one of ordinary skill in the art. A user would easily be able to determine when the slope rod 40 is substantially parallel to the excavated surface 42, thus being able to determine with relative certainty that the excavated surface 42 had the correct slope 82 for the particular application.

In addition to a sloped surface, bench work can also be measured, as depicted in FIG. 7, wherein the excavated surface 42 comprises a vertical component or rise 88 and a horizontal component or run 90. One form of measuring these vertical distances 92 and horizontal distances 94 would be by adjusting the slope rod 40 to a particular position, such as indexing void 48c, wherein the distance from the first end 44 to the outer edge 96 of the survey rod 22 is a known component, and then taking a vertical measurement 98 from the markings on the survey rod. Additionally, in one form the novel portions of the slope measurement portion could be repositioned vertically to the desired vertical distance 92. The ratio of the rise 80 to run 90 is determined by the applicable standards, such as those listed above, for particular applications and soil types.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A slope assessment tool comprising:
   a. a rigid survey rod;
   b. a baseplate movably attached to the survey rod adjustable along a long axis of the survey rod;
   c. a level indicator indicating the vertical alignment of the survey rod; and
   d. a slope rod rotateably coupled to the baseplate.

2. The slope assessment tool as recited in claim 1 wherein the slope rod is positionably coupled to the baseplate so as to be coupled to the baseplate at varying locations along the slope rod.

3. The slope assessment tool as recited in claim 1 wherein the slope rod is magnetically coupled to the baseplate.

4. The slope assessment tool as recited in claim 1 further comprising an angle indicator indicating the relative angular position of the slope rod relative to the survey rod.

5. The slope assessment tool as recited in claim 4 wherein the angle indicator comprises a ball and socket arrangement for indexed angular positioning of the slope rod relative to the survey rod.

6. The slope assessment tool as recited in claim 1 wherein the level indicator is coupled to the baseplate.

\* \* \* \* \*